US011475273B1

United States Patent
Higgins et al.

(10) Patent No.: US 11,475,273 B1
(45) Date of Patent: *Oct. 18, 2022

(54) DEEP CONVOLUTIONAL NEURAL NETWORKS FOR AUTOMATED SCORING OF CONSTRUCTED RESPONSES

(71) Applicant: Educational Testing Service, Princeton, NJ (US)

(72) Inventors: Derrick Higgins, Chicago, IL (US); Lei Chen, Lawrenceville, NJ (US); Michael Heilman, Princeton, NJ (US); Klaus Zechner, Princeton, NJ (US); Nitin Madnani, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/827,804

(22) Filed: Mar. 24, 2020

Related U.S. Application Data

(63) Continuation of application No. 16/454,278, filed on Jun. 27, 2019, now Pat. No. 10,628,731, which is a
(Continued)

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS 5,778,152 A * 7/1998 Oki .......................... G06N 3/08
706/31
6,356,864 B1 * 3/2002 Foltz ....................... G06F 40/30
704/9

(Continued)

OTHER PUBLICATIONS

Automatic scoring of short handwritten essays in reading comprehension tests Craig et al. (Year: 2007).*
(Continued)

*Primary Examiner* — Kakali Chaki
*Assistant Examiner* — Ababacar Seck
(74) *Attorney, Agent, or Firm* — Jones Day

(57) ABSTRACT

Systems and methods are provided for automatically scoring a constructed response. The constructed response is processed to generate a plurality of numerical vectors that is representative of the constructed response. A model is applied to the plurality of numerical vectors. The model includes an input layer configured to receive the plurality of numerical vectors, the input layer being connected to a following layer of the model via a first plurality of connections. Each of the connections has a first weight. An intermediate layer of nodes is configured to receive inputs from an immediately-preceding layer of the model via a second plurality of connections, each of the connections having a second weight. An output layer is connected to the intermediate layer via a third plurality of connections, each of the connections having a third weight. The output layer is configured to generate a score for the constructed response.

20 Claims, 9 Drawing Sheets

Related U.S. Application Data continuation of application No. 14/634,203, filed on Feb. 27, 2015, now Pat. No. 10,373,047.

(60) Provisional application No. 61/945,874, filed on Feb. 28, 2014.

(56) References Cited

U.S. PATENT DOCUMENTS

| | | | | |
|---|---|---|---|---|
| 7,155,157 | B2* | 12/2006 | Kaplan | G09B 7/00 434/323 |
| 2011/0270883 | A1* | 11/2011 | Bukai | G06F 16/951 707/777 |
| 2012/0088219 | A1* | 4/2012 | Briscoe | G06N 20/10 434/362 |
| 2014/0288928 | A1 | 9/2014 | Penn et al. | |

OTHER PUBLICATIONS

Automated Scoring of Short-Answer Open-Ended GRE® Subject Test Items Attali et al. (Year: 2008).*
Automated Scoring of Constructed-Response Literacy and Mathematics Items Dr. Randy Elliot Bennett (Year: 2011).*
C-rater:Automatic Content Scoring for Short Constructed Responses Sukkarieh et al. (Year: 2009).*
Automated Diagnostic Writing Tests: Why? How? Cotos et al. (Year: 2008).*
Chapter 4—Technological Issues for Computer-Based Assessment Csapo et al. (Year: 2012).*
Multiple Choice and Constructed Response Tests: Do Test Format and Scoring Matter? Kastner et al. (Year: 2011).*
Automatic Generation of Multiple Choice Questions From Domain Ontologies Papasalouros et al. (Year: 2008).*
Conv Nets: A Modular Perspective; Colah's blog; http://colah.github.io/posts/2014-07-Conv-Nets-Modular/; Jul. 2014.
2.5.1 Feedforward Neural Networks; Neural Networks Documentation; http://reference.wolfram.com/applications/neuralnetworks/NeuralNetworkTheory/2.5.1.html.
Feedforward Neural Networks 1. What is a feedforward neural network?; http://www.fon.hum.uva.nl/praat/manual/Feedforward_neural_networks_1__What_is_a_feedforward_ne.html.
Harris, Derrick; The Gigaom Guide to Deep Learning: Who's doing it, and why it matters; https://gigaom.com/2013/11/01/the-gigaom-guide-to-deep-learning-whos-doing-it-and-why-it-matters/.
Harris, Derrick; We're on the Cusp of Deep Learning for the Masses: You can thank Google later; https://gigaom.com/2013/08/16/were-on-the-cusp-of-deep-learning-for-the-masses-you-can-thank-google-later/.
Kalchbrenner, Nal, Grefenstette, Edward, Blunsom, Phil; A Convolutional Neural Network for Modelling Sentences; Proceedings of the 52nd Annual Meeting of the Association for Computational Linguistics; pp. 655-665; Jun. 2014.
Nogueira Dos Santos, Cicero, Gatti, Maira; Deep Convolutional Neural Networks for Sentiment Analysis of Short Texts; Proceedings of the 25th International Conference on Computational Linguistics; pp. 69-78; Aug. 2014.
Zhang, Xiang, Lecun, Yann; Text Understanding from Scratch; arXiv:1502.01710; Cornell University Library; Feb. 2015.
Attali, Yigal, Powers, Don, Freedman, Marshall, Harrison, Marissa, Obetz, Susan; Automated Scoring of Short-Answer Open-Ended GRE Subject Test Items; ETS GRE Board Research Report No. 04-02, ETS RR-08-20; Educational Testing Service; Apr. 2008.
Srihari, Sargur, Collins, Jim, Srihari, Rohini, Srinivasan, Harish, Shetty, Shravya, Brutt-Griffler, Janina; Automatic Scoring of Short Handwritten Essays in Reading Comprehension Tests; Artificial Intelligence, 172; pp. 300-324; 2008.
Bennett; Randy Elliot; Automated Scoring of Constructed-Response Literacy and Mathematics Items; Jan. 2011.
Sukkarieh, Jana, Blackmore, John; c-rater: Automatic Scoring for Short Constructed Responses; Proceedings of the 22nd International FLAIRS Conference; pp. 290-295; 2009.

\* cited by examiner

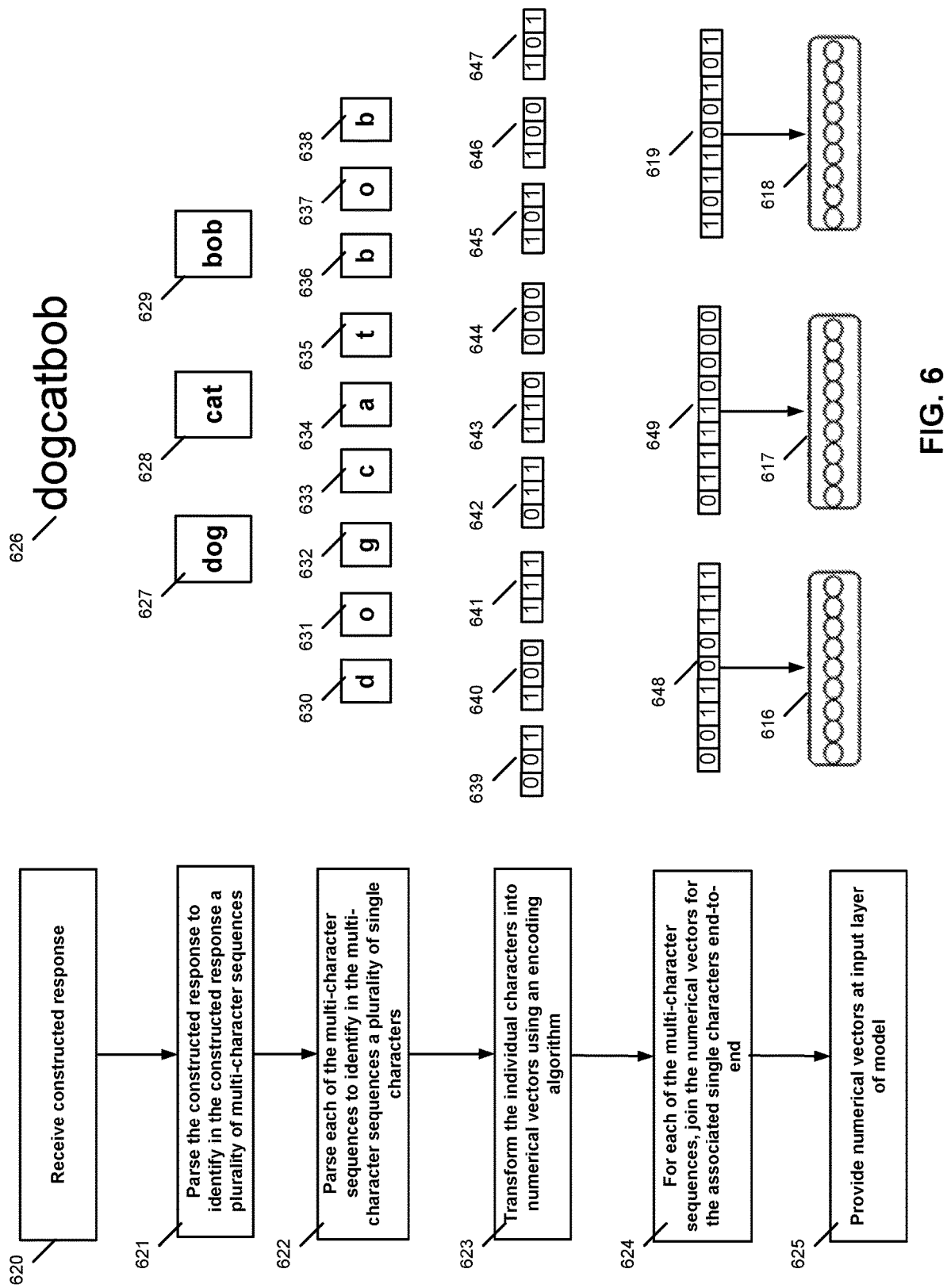

DEEP CONVOLUTIONAL NEURAL NETWORKS FOR AUTOMATED SCORING OF CONSTRUCTED RESPONSES

CROSS-REFERENCE TO RELATED APPLICATIONS

This application is a continuation application of U.S. patent application Ser. No. 16/454,278, filed Jun. 27, 2019, which is a continuation application of U.S. patent application Ser. No. 14/634,203, filed Feb. 27, 2015, entitled "Deep Convolutional Neural Networks for Automated Scoring of Constructed Responses," which claims priority to U.S. Provisional Patent Application No. 61/945,874, filed Feb. 28, 2014, entitled "Deep Learning for Automated Constructed-Response Scoring," both of which are incorporated herein by reference in their entireties.

FIELD

The technology described in this patent document relates generally to computer-based test scoring systems and more particularly to a system and method for automatically scoring a constructed response using a deep convolutional neural network.

BACKGROUND

To evaluate the understanding, comprehension, or skill of students in an academic environment, the students are tested. Typically, educators rely on multiple-choice examinations to evaluate students. Multiple-choice examinations quickly provide feedback to educators on the students' progress. However, multiple-choice examinations may reward students for recognizing an answer versus constructing or recalling an answer. Thus, another method of evaluating students utilizes test questions that require a constructed response. Examples of constructed responses include free-form, non-multiple choice responses such as essays, spoken responses, or show-your-work math responses. For some educators, use of a constructed response examination is preferred versus a multiple-choice examination because the constructed response examination requires the student to understand and articulate concepts in the tested subject matter. However, a length of time required to grade a constructed response may be considerable.

SUMMARY

The present disclosure is directed to a computer-implemented method, system, and non-transitory computer-readable storage medium for automatically scoring a constructed response using a convolutional neural network. In an example computer-implemented method of automatically scoring a constructed response using a convolutional neural network, a constructed response is obtained. The constructed response may be a textual response or a spoken response, for example. The constructed response is processed with a processing system to generate a plurality of first vectors containing numeric values, the plurality of first vectors being representative of the constructed response. Using the processing system, a convolution layer of a convolutional neural network is applied to the plurality of first vectors, where the convolution layer includes a first plurality of nodes that each receive input from the plurality of first vectors. Using the processing system, a hidden layer of the convolutional neural network is applied to an output of the convolution layer in order to generate a plurality of second vectors. The hidden layer includes a second plurality of nodes that each receive input from at least one of the first plurality of nodes. Using the processing system, an output layer of the convolutional neural network is applied to an output of a top-most hidden layer in order to generate a score for the constructed response.

An example system for automatically scoring a constructed response using a convolutional neural network includes a processing system and computer-readable memory in communication with the processing system encoded with instructions for commanding the processing system to execute steps. In executing the steps, a constructed response is obtained. The constructed response is processed to generate a plurality of first vectors containing numeric values, the plurality of first vectors being representative of the constructed response. A convolution layer of a convolutional neural network is applied to the plurality of first vectors, where the convolution layer includes a first plurality of nodes that each receive input from the plurality of first vectors. A hidden layer of the convolutional neural network is applied to an output of the convolution layer in order to generate a plurality of second vectors. The hidden layer includes a second plurality of nodes that each receive input from at least one of the first plurality of nodes. An output layer of the convolutional neural network is applied to an output of a top-most hidden layer in order to generate a score for the constructed response.

An example non-transitory computer-readable storage medium for automatically scoring a constructed response using a convolutional neural network comprises computer executable instructions which, when executed, cause a processing system to execute steps. In executing the steps, a constructed response is obtained. The constructed response is processed to generate a plurality of first vectors containing numeric values, the plurality of first vectors being representative of the constructed response. A convolution layer of a convolutional neural network is applied to the plurality of first vectors, where the convolution layer includes a first plurality of nodes that each receive input from the plurality of first vectors. A hidden layer of the convolutional neural network is applied to an output of the convolution layer in order to generate a plurality of second vectors. The hidden layer includes a second plurality of nodes that each receive input from at least one of the first plurality of nodes. An output layer of the convolutional neural network is applied to an output of a top-most hidden layer in order to generate a score for the constructed response.

The present disclosure is also directed to a computer-implemented method, system, and non-transitory computer-readable storage medium for automatically scoring a constructed response generated by a user. In an example computer-implemented method of automatically scoring a constructed response generated by a user, a constructed response generated by a user is received, the constructed response being based on a given item. The constructed response is parsed with a processing system to identify in the constructed response a plurality of multi-character sequences. The plurality of multi-character sequences is processed with the processing system to generate a plurality of numerical vectors that is representative of the constructed response. A convolutional neural network model associated with the given item is applied to the plurality of numerical vectors to determine a score for the constructed response. The convolutional neural network model includes an input layer configured to receive the plurality of numerical vectors, the input layer being connected to a following layer of the convolutional neural network model via a first plurality of connections. Each of the connections has an associated first weight and passes a portion of the plurality of numerical vectors to the following layer. At least a subset of the connections have a same first weight. The convolutional neural network model also includes a convolution layer including a plurality of nodes, where each node of the convolution layer receives input from an immediately-preceding layer of the convolutional neural network model. The convolutional neural network model also includes a hidden layer of nodes configured to receive inputs from the convolution layer via a second plurality of connections, each of the second plurality of connections having an associated second weight. At least a subset of the second plurality of connections have a same second weight. Each node of the hidden layer generates an output based on a weighted summation of received inputs. The convolutional neural network model further includes an output layer connected to the hidden layer via a third plurality of connections, each of the third plurality of connections having an associated third weight and passing one of the outputs from the hidden layer to the output layer. The output layer is configured to generate a score for the constructed response based on the received outputs and the third weights.

An example system for automatically scoring a constructed response generated by a user includes a processing system and a computer-readable memory in communication with the processing system. The computer-readable memory is encoded with instructions for commanding the processing system to execute steps. In executing the steps, a constructed response generated by a user is received, the constructed response being based on a given item. The constructed response is parsed to identify in the constructed response a plurality of multi-character sequences. The plurality of multi-character sequences is processed to generate a plurality of numerical vectors that is representative of the constructed response. A convolutional neural network model associated with the given item is applied to the plurality of numerical vectors to determine a score for the constructed response. The convolutional neural network model includes an input layer configured to receive the plurality of numerical vectors, the input layer being connected to a following layer of the convolutional neural network model via a first plurality of connections. Each of the connections has an associated first weight and passes a portion of the plurality of numerical vectors to the following layer. At least a subset of the connections have a same first weight. The convolutional neural network model also includes a convolution layer including a plurality of nodes, where each node of the convolution layer receives input from an immediately-preceding layer of the convolutional neural network model. The convolutional neural network model also includes a hidden layer of nodes configured to receive inputs from the convolution layer via a second plurality of connections, each of the second plurality of connections having an associated second weight. At least a subset of the second plurality of connections have a same second weight. Each node of the hidden layer generates an output based on a weighted summation of received inputs. The convolutional neural network model further includes an output layer connected to the hidden layer via a third plurality of connections, each of the third plurality of connections having an associated third weight and passing one of the outputs from the hidden layer to the output layer. The output layer is configured to generate a score for the constructed response based on the received outputs and the third weights.

In an example non-transitory computer-readable storage medium for automatically scoring a constructed response generated by a user, the computer-readable storage medium includes computer executable instructions which, when executed, cause a processing system to execute steps. In executing the steps, a constructed response generated by a user is received, the constructed response being based on a given item. The constructed response is parsed to identify in the constructed response a plurality of multi-character sequences. The plurality of multi-character sequences are processed to generate a plurality of numerical vectors that is representative of the constructed response. A convolutional neural network model associated with the given item is applied to the plurality of numerical vectors to determine a score for the constructed response. The convolutional neural network model includes an input layer configured to receive the plurality of numerical vectors, the input layer being connected to a following layer of the convolutional neural network model via a first plurality of connections. Each of the connections has an associated first weight and passes a portion of the plurality of numerical vectors to the following layer. At least a subset of the connections have a same first weight. The convolutional neural network model also includes a convolution layer including a plurality of nodes, where each node of the convolution layer receives input from an immediately-preceding layer of the convolutional neural network model. The convolutional neural network model also includes a hidden layer of nodes configured to receive inputs from the convolution layer via a second plurality of connections, each of the second plurality of connections having an associated second weight. At least a subset of the second plurality of connections have a same second weight. Each node of the hidden layer generates an output based on a weighted summation of received inputs. The convolutional neural network model further includes an output layer connected to the hidden layer via a third plurality of connections, each of the third plurality of connections having an associated third weight and passing one of the outputs from the hidden layer to the output layer. The output layer is configured to generate a score for the constructed response based on the received outputs and the third weights.

The present disclosure is also directed to a computer-implemented method, system, and non-transitory computer-readable storage medium for constructing a model to automatically score a constructed response. In an example computer-implemented method of constructing a model to automatically score a constructed response, a model associated with a given item is specified. The model includes an input layer configured to receive a plurality of numerical vectors that is representative of a constructed response, the input layer being connected to a following layer of the model via a first plurality of connections. Each of the connections has an associated first weight and passes a portion of the plurality of numerical vectors to the following layer. The model also includes a first hidden layer of nodes configured to receive inputs from an immediately-preceding layer of the model via a second plurality of connections, each of the second plurality of connections having an associated second weight. Each node of the first hidden layer generates an output based on a weighted summation of received inputs. The model further includes an output layer connected to the first hidden layer via a third plurality of connections, each of the third plurality of connections having an associated third weight and passing one of the outputs from the first hidden layer to the output layer. The output layer is configured to generate a score for the constructed response based on the received outputs and the third weights. Multiple reference responses are received for the given item. Each reference response has been given a reference score, and the reference responses span a range of reference scores. The multiple reference responses are processed to generate, for each reference response, a plurality of numerical vectors that is representative of the reference response. The model is trained with a processing system using the numerical vectors representative of the reference responses and the reference scores to determine values for each of the first, second, and third weights. The model is configured with the determined values of the first, second, and third weights to receive a plurality of numerical vectors that is representative of an actual constructed response to be scored so as to generate a score for the actual constructed response.

An example system for constructing a model to automatically score a constructed response includes a processing system and a computer-readable memory in communication with the processing system. The computer-readable memory is encoded with instructions for commanding the processing system to execute steps. In executing the steps, a model associated with a given item is specified. The model includes an input layer configured to receive a plurality of numerical vectors that is representative of a constructed response, the input layer being connected to a following layer of the model via a first plurality of connections. Each of the connections has an associated first weight and passes a portion of the plurality of numerical vectors to the following layer. The model also includes a first hidden layer of nodes configured to receive inputs from an immediately-preceding layer of the model via a second plurality of connections, each of the second plurality of connections having an associated second weight. Each node of the first hidden layer generates an output based on a weighted summation of received inputs. The model further includes an output layer connected to the first hidden layer via a third plurality of connections, each of the third plurality of connections having an associated third weight and passing one of the outputs from the first hidden layer to the output layer. The output layer is configured to generate a score for the constructed response based on the received outputs and the third weights. Multiple reference responses are received for the given item. Each reference response has been given a reference score, and the reference responses span a range of reference scores. The multiple reference responses are processed to generate, for each reference response, a plurality of numerical vectors that is representative of the reference response. The model is trained using the numerical vectors representative of the reference responses and the reference scores to determine values for each of the first, second, and third weights. The model is configured with the determined values of the first, second, and third weights to receive a plurality of numerical vectors that is representative of an actual constructed response to be scored so as to generate a score for the actual constructed response.

An example non-transitory computer-readable storage medium for constructing a model to automatically score a constructed response includes computer executable instructions. When executed, the computer executable instructions cause a processing system to execute steps. In executing the steps, a model associated with a given item is specified. The model includes an input layer configured to receive a plurality of numerical vectors that is representative of a constructed response, the input layer being connected to a following layer of the model via a first plurality of connections. Each of the connections has an associated first weight and passes a portion of the plurality of numerical vectors to the following layer. The model also includes a first hidden layer of nodes configured to receive inputs from an immediately-preceding layer of the model via a second plurality of connections, each of the second plurality of connections having an associated second weight. Each node of the first hidden layer generates an output based on a weighted summation of received inputs. The model further includes an output layer connected to the first hidden layer via a third plurality of connections, each of the third plurality of connections having an associated third weight and passing one of the outputs from the first hidden layer to the output layer. The output layer is configured to generate a score for the constructed response based on the received outputs and the third weights. Multiple reference responses are received for the given item. Each reference response has been given a reference score, and the reference responses span a range of reference scores. The multiple reference responses are processed to generate, for each reference response, a plurality of numerical vectors that is representative of the reference response. The model is trained using the numerical vectors representative of the reference responses and the reference scores to determine values for each of the first, second, and third weights. The model is configured with the determined values of the first, second, and third weights to receive a plurality of numerical vectors that is representative of an actual constructed response to be scored so as to generate a score for the actual constructed response.

BRIEF DESCRIPTION OF THE DRAWINGS

FIG. 6 depicts example operations for processing a constructed response to generate a plurality of numerical vectors that is representative of the constructed response.

DETAILED DESCRIPTION

Figure 1:
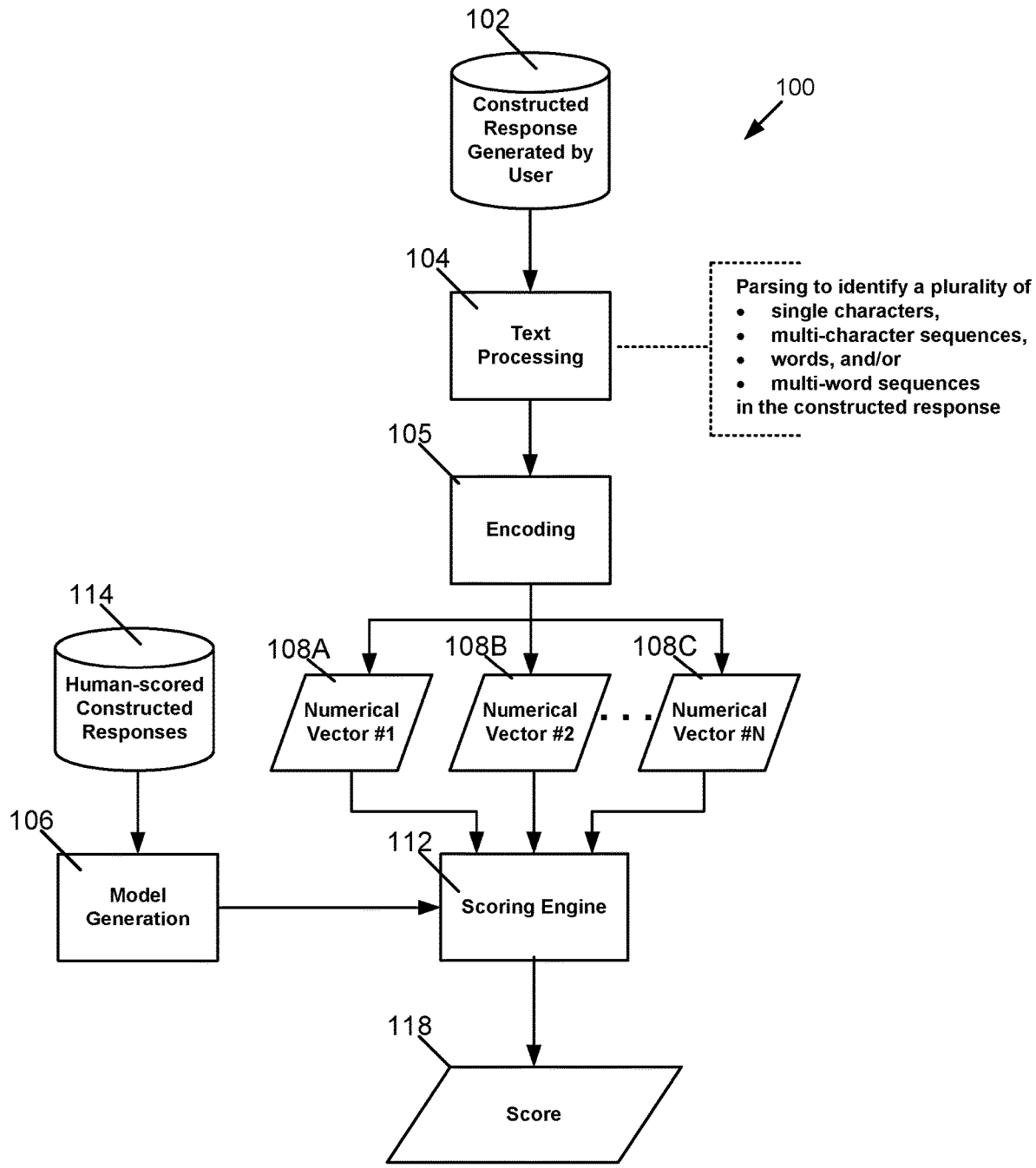
FIG. 1 is a block diagram illustrating an example system for automatically scoring a constructed response generated by a user.

FIG. 1 is a block diagram 100 illustrating an example computer-based system for automatically scoring a constructed response 102 generated by a user. In an example, the constructed response 102 is a textual response that is provided by the user in response to a given item (e.g., a test question, task, etc.). In an example, the given item includes a prompt that requests that the user generate a constructed response that is a short answer (e.g., a single word or phrase not comprising a complete sentence), one or more complete sentences, and/or an essay (e.g., comprising multiple sentences and/or paragraphs). In an example, the given item includes a prompt that requests a spoken response from the user. In an example, the given item is any type of open-ended question that requests a free-form, non-multiple choice response from the user. In the example, the user is a human that generates the constructed response 102.

In an example, the given item presented to the user is used in assessing the user's reading comprehension, as demonstrated by the constructed response 102. Thus, in an example, the given item includes a passage of text, and a prompt requests that the user summarize the passage of text. In other examples, the given item is used in assessing the user's understanding of a concept, as demonstrated by the constructed response 102. For example, the given item may include a prompt that requests that the user explain a concept (e.g., "Describe the process of osmosis."). In another example, the given item is used in assessing the user's vocabulary knowledge, as demonstrated by the constructed response 102. For example, the given item may include a prompt that requests that the user define a word or write one or more sentences using the word. Thus, a score 118 generated by the computer-based system of FIG. 1 may be intended to provide a measure of one or more of these abilities of the user (e.g., the user's reading comprehension, understanding of a concept, vocabulary knowledge, etc.).

The constructed response 102 generated by the user is received at a text processing module 104 of the computer-based system, in an embodiment. Text processing performed on the constructed response 102 at the text processing module 104 may include parsing the constructed response 102 with a processing system to identify in the constructed response 102 a plurality of individual characters. The text processing performed at the text processing module 104 may further include parsing the constructed response 102 with the processing system to identify in the constructed response 102 a plurality of multi-character sequences. In an example, the text processing module 104 identifies in the constructed response 102 sequences of characters having a fixed length. Thus, in an example where the constructed response 102 includes nine (9) characters (e.g., "dog cat bob"), three 3-character sequences (e.g., "dog," "cat," "bob") may be identified in the constructed response 102, for instance.

The text processing performed at the text processing module 104 may further include parsing the constructed response 102 with the processing system to identify in the constructed response 102 a plurality of words. In an example, the text processing performed at the text processing module 104 may also include parsing the constructed response 102 with the processing system to identify in the constructed response 102 a plurality of multi-word sequences. In an example, the text processing module 104 identifies in the constructed response 102 sequences of words having a fixed number of words. Thus, in an example where the constructed response 102 includes nine (9) words (e.g., "The boy and his dog walked down the street"), three 3-word sequences (e.g., "The boy and," "his dog walked," "down the street") may be identified in the constructed response 102, for instance.

The parsing performed at the text processing module 104 may be carried out using conventional automated, computer-based text parsing algorithms known to those of ordinary skill in the art. Various other processing and analysis may be performed on the constructed response 102 at the text processing module 104, such as correction of spelling errors in the constructed response 102, using conventional automated, computer-based algorithms known to those of ordinary skill in the art. The use of spelling correction algorithms can be beneficial to improve the quality of the assessment being carried out by reducing the likelihood of complications in the assessment caused by the presence of spelling errors.

An encoding module 105 receives an output of the text processing module 104, which may include a plurality of (i) single characters of the constructed response 102, (ii) multi-character sequences of the constructed response 102, (iii) words of the constructed response 102, and/or (iv) multi-word sequences of the constructed response 102. In an example, the encoding module 105 utilizes an encoding algorithm to transform one or more components of the output of the text processing module into numerical vectors 108A, 108B, 108C. In an example, such numerical vectors 108A, 108B, 108C comprise one-dimensional arrays, with each element of the arrays storing a number. In an example, the encoding module 105 utilizes the "word2vec" tool known to those of ordinary skill in the art. The word2vec tool is configured to receive a text input (e.g., one or more words or multi-word sequences) and generate one or more numerical vectors as an output.

The numerical vectors 108A, 108B, 108C comprise a vector-based representation of the constructed response 102. In an example where the text processing module 104 generates an output that is a plurality of sequences of characters having a fixed length, the encoding module 105 may transform each sequence of characters into a numerical vector. Thus, for instance, in the example described above, where the three 3-character sequences "dog," "cat," and "bob" are identified in the constructed response 102, each of these 3-character sequences may be transformed into a numerical vector. The numerical vectors for the three 3-character sequences may be the numerical vectors 108A, 108B, 108C illustrated in FIG. 1.

The plurality of numerical vectors 108A, 108B, 108C that is representative of the constructed response 102 is received at a scoring engine 112. The scoring engine 112 includes an automated scoring system configured to determine the score 118 for the constructed response 102. The score 118 may be a point score (e.g., 87 points out of 110 points possible), a percentage or decimal score (e.g., 95% correct), a classification (e.g., "high," "medium," "low," etc.), one or more probabilities (e.g., probability of 0.90 that user's understanding of a concept is high, probability of 0.07 that user's understanding is medium, and probability of 0.03 that user's understanding is low), or a ranking, for example. In an example, the automated scoring system is a computer-based system for automatically scoring the constructed response 102 that requires no human intervention or minimal human intervention. The scoring engine 112 may determine the score 118 for the constructed response 102 based on the plurality of numerical vectors 108A, 108B, 108C that is representative of the constructed response 102 and a convolutional neural network model.

A convolutional neural network is a type of neural network that uses many identical copies of the same neuron (i.e., the same node). This allows the convolutional neural network to include a large number of neurons and to express computationally large models while keeping a number of parameters (e.g., parameter values that describe how the neurons behave, such as weights) that need to be learned fairly small. Thus, as described below, connections between layers of the convolutional neural network are associated with weights, and in examples, at least a subset of the connections share a same weighting factor.

As described in further detail below, the convolutional neural network model may include multiple layers that are connected via a plurality of connections. Each of the connections is used in passing information between layers of the convolutional neural network model, in an example. Further, each of the connections is associated with a weight (e.g., a weighting factor), and the weights of the convolutional neural network model are determined based on a plurality of human-scored constructed responses 114, in an example. In an example, the convolutional neural network model includes a convolutional neural network that is configured to receive the numerical vectors 108A, 108B, 108C and to determine the score 118 that provides a measure of one or more abilities of the user (e.g., the user's reading comprehension, understanding of a concept, vocabulary knowledge, etc.).

To generate the convolutional neural network model used in the scoring engine 112, a model generation module 106 may be used. The model generation module 106 receives the plurality of human-scored constructed responses 114 with associated scores for each of the constructed responses 114 and uses the plurality of human-scored constructed responses 114 to determine the weights for the model. The model generation module 106 may perform text processing similar to that performed by the text processing module 104, and the model generation module 106 may also utilize an encoding algorithm to generate a plurality of numerical vectors for each of the human-scored constructed responses 114. Thus, for example, the model generation module 106 may parse each of the human-scored constructed responses 114 to identify in the human-scored constructed response a plurality of (i) single characters, (ii) multi-character sequences, (iii) words, and/or (iv) multi-word sequences. The encoding algorithm utilized by the model generation module 106 may be used to transform one or more of the single characters, multi-character sequences, words, and/or multi-word sequences into a plurality of numerical vectors that is representative of the human-scored constructed response.

In an example, the plurality of human-scored constructed responses 114 may span a range of reference scores, and the constructed responses 114 may be scored constructed responses that have been accepted as usable for training the convolutional neural network model. In an example, the weights of the model are determined using an optimization procedure for training convolutional neural networks, such as stochastic gradient descent (SGD). In an example, values for the weights are iteratively modified in order to reduce a loss function associated with scoring accuracy, such as the root-mean-squared error. As illustrated in FIG. 1, the model generation module 106 provides the model to the scoring engine 112. With the convolutional neural network model in place, the constructed response 102 may be scored by applying the convolutional neural network model as noted above.

It should be appreciated that under the approaches described herein, one or more computer-based models are used in determining the score 118 for the constructed response 102. As described above, such computer-based models may be trained via an optimization procedure for convolutional neural networks (e.g., stochastic gradient descent) in order to determine weights for the models. By contrast, conventional human scoring techniques for determining a score for a constructed response would include none of these steps. Conventional human scoring techniques involve one or more human graders reviewing constructed responses and manually assigning scores to the constructed responses.

It should also be appreciated that the approaches described herein differ from conventional techniques for automated scoring of constructed responses. Such conventional techniques are based on human-engineered features that are extracted from a constructed response and then provided to a scoring model or scoring equation to determine a score for the constructed response. The human-engineered features are developed by one or more humans based on the humans' belief that such features provide useful information about a construct to be measured. For example, in measuring a user's vocabulary knowledge as presented in a constructed response, a human may believe that an "average word length" feature provides useful information about the user's vocabulary knowledge. This feature may then be used within the context of a conventional technique for automated scoring of a constructed response. Such conventional techniques for automated scoring generally include a "training" phase whereby (i) human-engineered features are extracted from human-scored responses, and (ii) the extracted features and the scores assigned to the responses are used to train a scoring model using a machine-learning application (e.g., using linear regression, Support Vector Machine (SVM), or other machine-learning methods). The training of the model may include determining weights that are associated with the human-engineered features. In the conventional techniques for automated scoring, the trained scoring model generates scores for the responses based on the extracted human-engineered features.

By contrast, the approaches described herein do not utilize manually-defined, human-engineered features. Rather, in the approaches described herein, any features used in scoring are engineered (i.e., chosen, designed) by the computer-based system (i.e., and not by a human), based on directly-observable elements of constructed responses (e.g., words, characters, sequences of characters, acoustic frames, etc.). Thus, the approaches described herein enable responses to open-ended questions to be scored by allowing a computer-based system to induce the characteristics of appropriate response types from a scored sample of responses, rather than by requiring manual encoding of features or response patterns by humans. The conventional techniques described above may utilize features that encode the presence of sequences of characters and words, and one limitation of the conventional techniques is that such sequences of characters and words must be determined according to some heuristic, such as their frequency in a data set. By contrast, the approaches described herein utilize a "deep learning" technique that obviates the need for heuristic encoding of an input feature space and allows more appropriate and general features to be induced by the computer-based system.

As described in further detail below, the approaches described herein may utilize a non-linear mapping of an input (e.g., a plurality of numerical vectors that is representative of a constructed response) into an embedded space (e.g., a compressed vector representation of the input) that is represented by a plurality of hidden nodes of a convolution neural network. This mapping allows the computer-based system to design higher-level features representing meaningful and predictive characteristics of constructed responses. Such higher-level features may be difficult or impossible for a human to design (e.g., features that encode character co-occurrence patterns in a response above and beyond strictly adjacent sequences, etc.). The computer-engineered features are built upon simple, directly-observable elements of constructed responses (e.g., words, characters, acoustic frames, etc.) and are not based upon human-engineered features. The approaches described herein, including the computer-based system that operates directly on such directly-observable elements of constructed responses, varies from the conventional automated scoring techniques, which require that any directly-observable elements be pre-processed into "features" that are not directly-observable elements. Such features include lower-level features (e.g., n-grams of a constructed response) and higher-order features (e.g., features that relate to a presence of a particular concept or pattern in a constructed response).

As described above with reference to FIG. 1, a convolutional neural network model utilized by the scoring engine 118 may include a convolutional neural network that is configured to receive the numerical vectors 108A, 108B, 108C and to determine the score 118 for the constructed response 102. A convolutional neural network includes multiple nodes organized in layers. In an example, each node in a layer is connected with all nodes of an immediately preceding layer. Each connection between nodes (which may be referred to as an "edge") has an associated strength or weight. In an example, the weights of the connections encode the knowledge of the convolutional neural network.

The convolutional neural network may be configured to generate multiple scores for the constructed response. In an example, each of the multiple scores represents a probability. For example, a given item may include a prompt that requests that the user generate a constructed response that explains the process of osmosis. The constructed response may be scored using the convolutional neural network to generate the multiple scores for the constructed response, where each of the multiple scores represents a probability (e.g., a first score represents a probability that the user's understanding of osmosis is very high, a second score represents a probability that the user's understanding of osmosis is high, a third score represents a probability that the user's understanding of osmosis is average, a fourth score represents a probability that the user's understanding of osmosis is low, and a fifth score represents a probability that the user's understanding of osmosis is very low).

In another example, each of the multiple scores represents a binary number that classifies the user (e.g., a first binary score has a first logical value if the convolutional neural network determines that the user's understanding of osmosis is very high and a second logical value if the convolutional neural network determines that the user's understanding of osmosis is not very high, and so on). The multiple scores may represent other values in other examples. Further, in other examples, the convolutional neural network generates a single score. In these other examples, an output layer of the convolutional neural network may have a single node, in contrast to the multiple nodes of the output layer that may be used when multiple scores are generated.

Input data is received at nodes of an input layer of the convolutional neural network, and the data passes through the convolutional neural network, layer-by-layer, until the data arrives at the nodes of the output layer. There is no feedback between the layers of the network, in an example. The layers of the convolutional neural network include the input layer, the output layer, one or more convolutional layers, and one or more hidden layers. In an example, each convolution layer includes a plurality of nodes (e.g., convolution units). Hidden layers of the network may be referred to herein as "intermediate layers." The convolutional neural network may have any number of hidden layers.

The input layer of the convolutional neural network may be configured to receive a plurality of numerical vectors that is representative of a constructed response to be scored. The input layer is connected to a following layer of the convolutional neural network via a first plurality of connections. Each of the connections has an associated first weight and passes a portion of the plurality of numerical vectors 202 to the following layer. In an example, at least a subset of the connections have a same first weight.

A hidden layer of nodes of the convolutional neural network may be configured to receive inputs from the convolution layer of the network via a second plurality of connections. In an example, the convolution layer is configured to store a numerical vector that is based on a convolution of other numerical vectors generated by another layer of the convolutional neural network. An example convolution layer is described in further detail below with reference to FIGS. 2A, 2B, and 4. Each of the second plurality of connections that connect the hidden layer to the convolution layer has an associated second weight. In an example, at least a subset of the second plurality of connections have a same second weight.

Each node of the hidden layer generates an output based on (i) a weighted summation of received inputs, and (ii) an activation function. Specifically, a node of the hidden layer receives inputs from nodes of the convolution layer of the model via one or more weighted connections. The node of the hidden layer performs a weighted summation of the inputs, and the result of the weighted summation is then transformed by the activation function. In an example, the functionality of the node of the hidden layer is described by:

$$\sigma\left(\sum_{j=1}^{n} w_j x_j + b_j\right),$$

where n is the number of inputs received at the node of the hidden layer, $x_1 \ldots x_n$ are values of the inputs received at the node, $\{w_j, b_j\}$ are weights for an input j received at the node, and $\sigma$ is the activation function. $\sigma$ is a nonlinear activation function, in an embodiment. In an example, the nonlinear activation function may be a sigmoidal function represented by:

$$\text{sigmoid}[x] = \frac{1}{1+e^{-x}}.$$

The output layer of the convolutional neural network is connected to a top-most hidden layer of the network via a third plurality of connections. Each of the third plurality of connections has an associated third weight and passes one of the outputs from the top-most hidden layer to the output layer. The output layer is configured to generate one or more scores for the constructed response based on the outputs from the top-most hidden layer and the third weights. In an example, each node of the output layer generates a score based on a weighted summation of inputs received from the top-most hidden layer and an activation function.

In an example, each of the first, second, and third weights of the convolutional neural network are determined via an optimization procedure for neural networks that utilizes a plurality of human-scored constructed responses. In an example, a plurality of numerical vectors representative of a human-scored constructed response is received at the input layer of the convolutional neural network. The input data passes through the convolutional neural network and reaches the output layer. The outputs of the convolutional neural network present at the nodes of the output layer are compared with the human-assigned scores for the constructed response. On the basis of this comparison, one or more of the first, second, and third weights are modified, such that if the same plurality of numerical vectors is subsequently received at the input layer, then the outputs of the convolutional neural network present at the nodes of the output layer will correspond better with the human-assigned scores. Each of the plurality of human-scored constructed responses may be used to train the convolutional neural network in a similar manner.

Figure 2A:
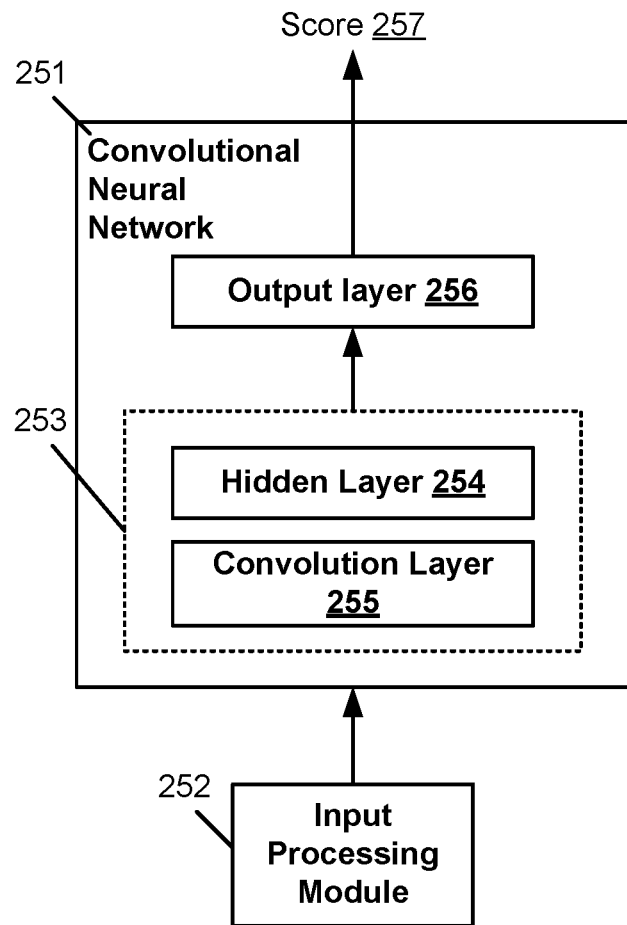
FIG. 2A is a block diagram depicting an example architecture of a convolutional neural network configured to score a constructed response.

FIG. 2A is a block diagram depicting an example architecture of a convolutional neural network 251 configured to score a constructed response. The convolutional neural network 251 may be configured to automatically score a constructed response (e.g., a textual response, a spoken response). Thus, the convolutional neural network 251 may be applied to the constructed response, and an output of an output layer 256 may be a score 257 for the constructed response. An input processing module 252 processes the constructed response with a processing system to generate a plurality of first vectors containing numeric values. The plurality of first vectors are representative of the constructed response. In an example, the input processing module 252 is configured to parse the constructed response to identify in the constructed response a plurality of words. The input processing module 252 may then be configured to transform each of the words into a first vector containing numeric values (e.g., using an encoding algorithm).

Figure 2B:
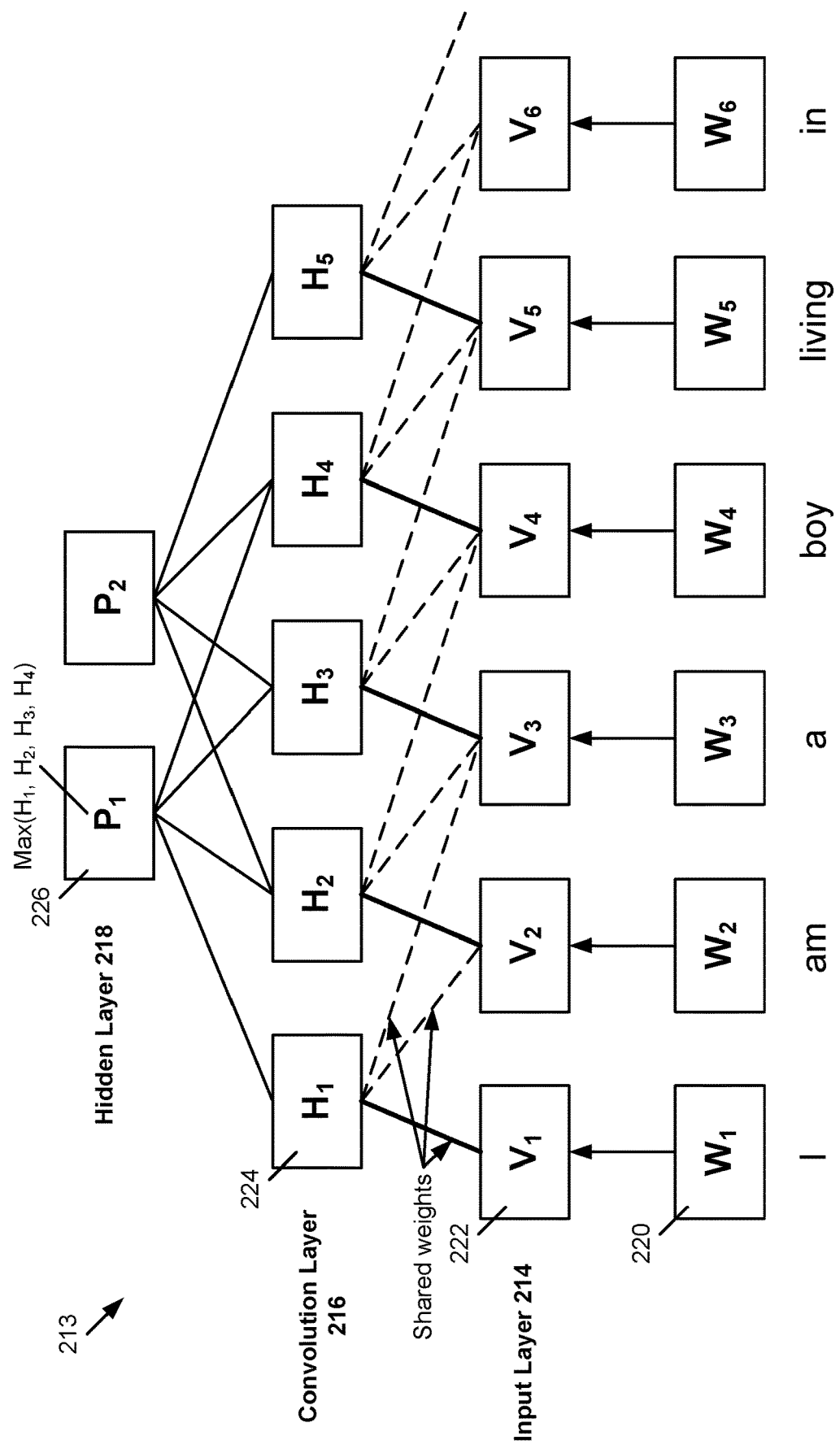
FIG. 2B depicts an example convolutional neural network configured to automatically score a constructed response generated by a user.

With reference to FIG. 2B, a constructed response including "I am a boy living in" may be parsed to identify each of the individual words included in the constructed response. The input processing module 252 may apply an encoding algorithm to transform each of the individual words into a first vector 220 containing numeric values. The first vectors 220 may be input to an input layer 214 of a convolutional neural network model 213, as shown in FIG. 2B. The input layer 214 may include a plurality of nodes or sets of nodes 222, where each node or set of nodes 222 is configured to receive a first vector 220 associated with a particular word of the constructed response, in an example. The transforming of words into first vectors may be known as "word embedding" or "embedding at a word level." In examples where the constructed response is a spoken response, the input processing module 252 may generate the first vectors using framing (e.g., identifying acoustic frames in the constructed response) and additional signal processing (e.g., running a filter bank analysis to identify cepstral features associated with acoustic frames, etc.). Regardless of whether the constructed response is a textual response or a spoken response, the first vectors 220 representing the response are received at the nodes or sets of nodes 222 of the input layer 214 of the network 213.

As shown in FIG. 2A, the convolutional neural network 251 comprises at least one pair of layers 253, where each pair 253 includes a convolution layer 255 and a hidden layer 254. The convolution layer 255 is applied to the plurality of first vectors generated by the input processing module 252. The convolution layer 255 includes a first plurality of nodes (e.g., a first plurality of convolution units) that each receive input from the plurality of first vectors. With reference to FIG. 2B, a convolution layer 216 is applied to the plurality of first vectors 220 received at the input layer 214. The convolution layer 216 includes a first plurality of nodes 224 that each receive input from the plurality of first vectors 220 via the input layer 214. In an example, each node of the convolution layer 216 applies a set of kernels that operate on the input received from the plurality of first vectors 220.

In FIG. 2A, the hidden layer 254 is applied to an output of the convolution layer 255 in order to generate a plurality of second vectors. In an example, the plurality of second vectors comprise a representation of informative patterns included in the constructed response that may be useful in scoring the constructed response. The hidden layer 254 may include a second plurality of nodes (e.g., pooling units) that each receive input from at least one of the first plurality of nodes of the convolution layer 255. With reference to FIG. 2B, a hidden layer 218 is applied to an output of the convolution layer 216 in order to generate a plurality of second vectors. The hidden layer 218 includes a second plurality of nodes (e.g., pooling units) 226 that each receive input from at least one of the nodes 224 of the convolution layer 216.

In an example, the hidden layer 218 applies a hidden layer function to one or more outputs of the convolution layer 216. The hidden layer function may be an average or a maximum function or any other function that aggregates multiple values into a single value. Thus, as shown in the example of FIG. 2B, a node 226 of the hidden layer 218 applies a hidden layer function which is a maximum of outputs $H_1$, $H_2$, $H_3$, $H_4$ from the convolution layer 216. With reference again to FIG. 2A, an output layer 256 of the convolutional neural network 251 may be applied to an output of a top-most hidden layer of the network 251 in order to generate the score 257 for the constructed response. In an example, the output layer 256 may be applied to combine outputs from nodes of the top-most hidden layer.

Although the example of FIG. 2A depicts a single pair 253 of hidden layer 254 and convolution layer 255, it should be appreciated that there may be multiple pairs of these layers in a convolutional neural network. In an example, a second convolution layer of the convolutional neural network 251 is applied to the plurality of second vectors generated by the hidden layer 254. The second convolution layer may include a third plurality of nodes (e.g., convolution units) that each receive input from the plurality of second vectors.

Referring again to FIG. 2B, the convolution layer 216 is applied to the plurality of first vectors 220 using the input layer 214, which passes the first vectors 220 to the convolution layer 216 via a plurality of first connections. Each of the first connections has an associated weight. As illustrated in FIG. 2B, at least a subset of the plurality of first connections may have a same weight. Such weights may be used in computing outputs (e.g., activations) of the convolution layer 216. As noted above, the hidden layer 218 may be applied to the outputs of the convolution layer 216. Each node or set of nodes 226 of the hidden layer 218 receives input from nodes or sets of nodes 224 of the convolution layer via a plurality of second connections. In an example, at least a subset of the plurality of second connections may have a same weight. Such weights may be used in computing outputs (e.g., activations) of the hidden layer 218. Examples of functions that may be used by the hidden layer 218 include maximum, sum, and average functions. In an example, a function used by the hidden layer 218 may be any function that can compute a single value from multiple values.

It should be appreciated that the convolutional neural network 213 of FIG. 2B is exemplary only. Thus, although the network 213 includes a single convolutional layer and a single hidden layer, in other examples, there may be a different number of convolutional layers and hidden layers.

Figure 3:
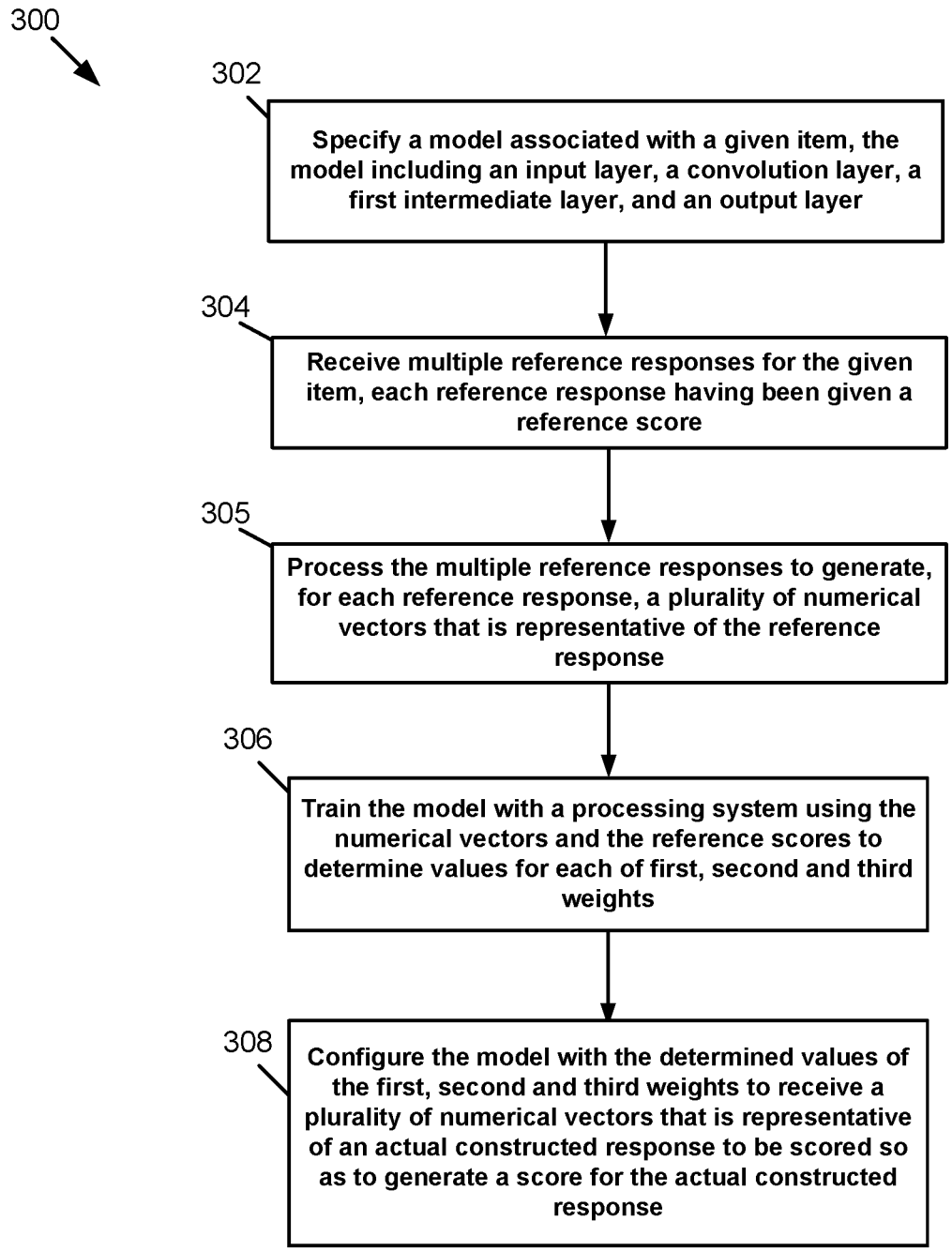
FIG. 3 is a flowchart depicting operations of an example method for constructing a model to automatically score a constructed response.

FIG. 3 is a flowchart 300 depicting operations of an example method for constructing a model to automatically score a constructed response. The model may be, for example, a convolutional neural network model. As described above with reference to FIG. 1, a model generation module 106 receives the plurality of human-scored constructed responses 114 and uses the plurality of human-scored constructed responses 114 to determine weights of the model. The example operations depicted in the flowchart 300 of FIG. 3 provide further details on the building of such a model.

At 302, a model associated with a given item is specified. The model may be, for example, a convolutional neural network model. The model includes an input layer configured to receive a plurality of numerical vectors that is representative of a constructed response, the input layer being connected to a following layer of the model via a first plurality of connections. Each of the connections has an associated first weight and passes a portion of the plurality of numerical vectors to the following layer. In an example, at least a subset of the connections have a same first weight. The model also includes a convolution layer including a plurality of nodes, where each node of the convolution layer receives input from an immediately-preceding layer of the convolutional neural network. The model also includes a first intermediate layer (i.e., a first hidden layer) of nodes configured to receive inputs from the convolution layer of the model via a second plurality of connections. Each of the second plurality of connections has an associated second weight, and each node of the first intermediate layer generates an output based on a weighted summation of received inputs. In an example, at least a subset of the second plurality of connections have a same second weight.

The model further includes an output layer connected to the first intermediate layer via a third plurality of connections. Each of the third plurality of connections has an associated third weight and passes one of the outputs from the first intermediate layer to the output layer. The output layer is configured to generate a score for the constructed response based on the received outputs and the third weights. In other examples, the model includes additional layers (e.g., additional hidden layers, additional convolution layers, etc.) and weights or different layers and weights. An example model including layers in addition to the input layer, convolution layer, first intermediate layer, and output layer described above is described below with reference to FIG. 4.

At 304, a plurality of reference responses for the given item are received, each reference response having been given a reference score. The reference responses may span a range of reference scores, and the reference responses may have been accepted as usable for training the model. In an example, the reference scores given to the plurality of reference responses are assigned by one or more human graders. At 305, the multiple reference responses are processed to generate, for each reference response, a plurality of numerical vectors that is representative of the reference response. The processing of a constructed response to generate a plurality of numerical vectors that is representative of the constructed response is described below with reference to FIG. 6. At 306, the model is trained with a processing system using the numerical vectors representative of the reference responses and the reference scores to determine values for each of the first, second, and third weights. As explained above, in other examples, the model may include additional layers and weights or different layers and weights. Thus, the training of the model is used to determine values for the particular weights that are being used with the model, which may include the first, second, and third weights or other weights.

The training of the convolutional neural network model may include conducting a neural network optimization procedure (i.e., stochastic gradient descent) based on the numerical vectors representative of the reference responses and reference score for each of the plurality of reference responses to determine the first, second, and third weights. In another example, the training of the convolutional neural network model may include conducting another suitable numerical machine-learning analysis based on the numerical vectors representative of the reference responses and reference score for each of the plurality of reference responses to determine the first, second and third weights.

In the example of FIG. 3, the convolutional neural network model is trained using the plurality of reference responses that are based on the given item, and the convolutional neural network model is intended to be used thereafter in scoring constructed responses that are based on the given item. In this manner, the convolutional neural network model trained in the example of FIG. 3 may be item-specific. In other examples, however, the convolutional neural network model may be trained using data that does not relate to a given item, and the model may thereafter be used to score constructed responses that are based on various different items. Such a convolutional neural network model is not item-specific.

At 308, the model is configured with the determined values of the first, second, and third weights. The model is then ready to be used for scoring, i.e., to receive a plurality of numerical vectors that is representative of an actual constructed response from a user to be scored so as to generate a score for the actual constructed response. In this manner, the model is thereafter configured to perform automated scoring on new constructed responses that need to be scored.

Figure 4:
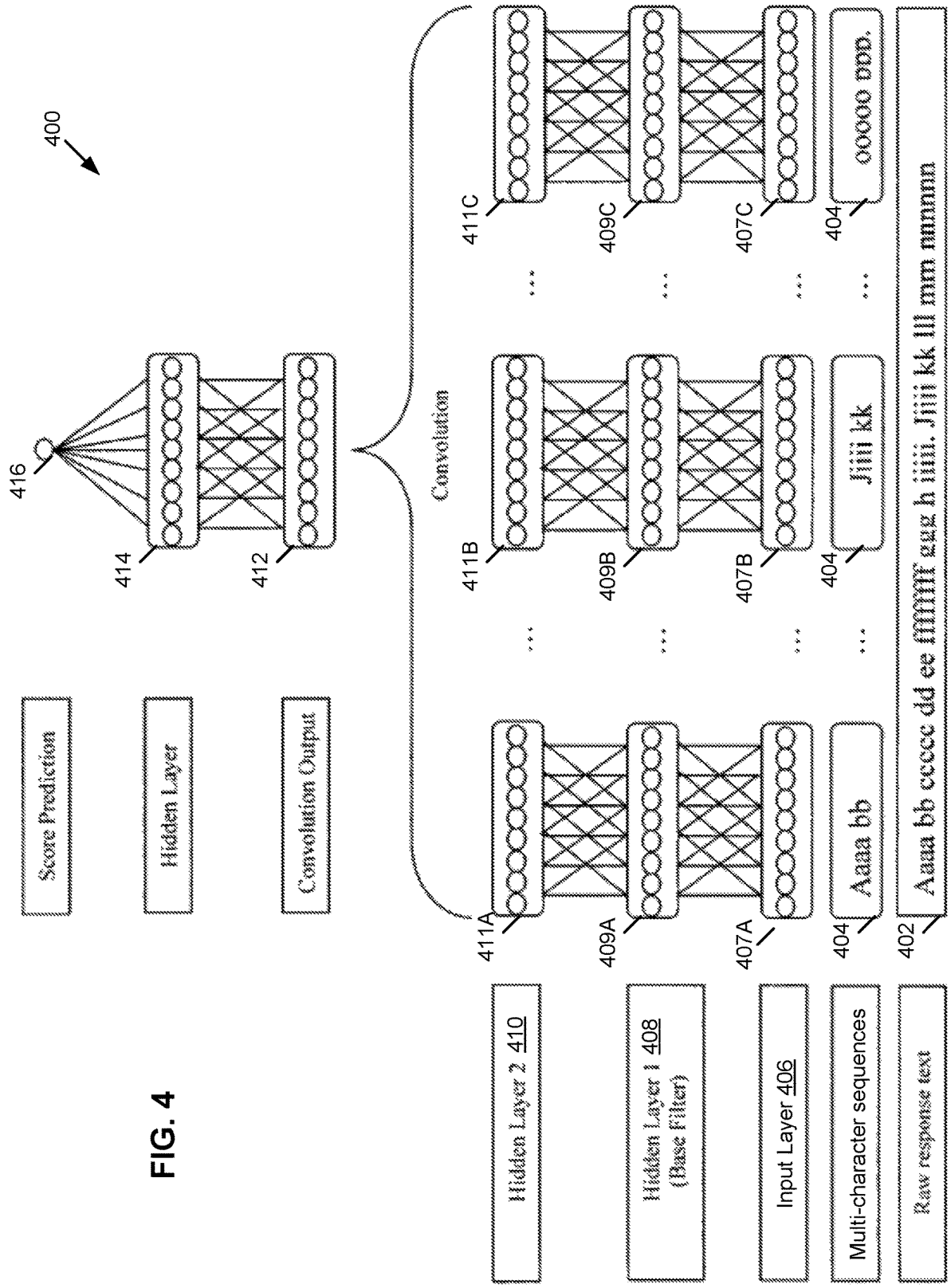
FIG. 4 depicts an example convolutional neural network configured to automatically score a constructed response generated by a user.

FIG. 4 depicts an example convolutional neural network 400 configured to automatically score a constructed response generated by a user. The example convolutional neural network 400 may be an example of a convolutional neural network model that may be constructed according to the operations described above with reference to FIG. 3. As shown in FIG. 4, the structure of the example convolutional neural network 400 includes a number of successive layers 406, 408, 410, 412, 414, 416. In an example, a layer feeds activation forward to successive layers by (i) multiplying activation values of a vector at a layer n of the network 400 by values of a weight matrix, and (ii) transforming the resultant values by a sigmoidal function. The values of the weight matrix comprise the weights that are associated with the connections between the various layers of the network 400. Such multiplying and transforming (described above) are performed to obtain an activation vector at a layer n+1 of the network 400. As described below, a convolution function used in obtaining a vector stored at a convolution layer 412 is an exception to this method of transforming activations between layers.

The convolutional neural network 400 is configured to receive a plurality of numerical vectors that is representative of the constructed response. To generate such numerical vectors, raw text 402 of the constructed response is parsed to identify in the raw text 402 a plurality of multi-character sequences 404. In an example, each of the multi-character sequences 404 has a fixed length (e.g., a same number of characters or a same number of words). Each of the multi-character sequences 404 is transformed into a numerical vector using an encoding algorithm. Thus, in FIG. 4, a multi-character sequence "Aaaa bb" is transformed into a numerical vector, a multi-character sequence "Jjjj kk" is transformed into another numerical vector, and so on. The transforming of each multi-character sequence into a numerical vector using an encoding algorithm is described in further detail below with reference to FIG. 6.

An input layer 406 of the network 400 is configured to receive the numerical vectors generated for each of the multi-character sequences 404. The input layer 406 comprises multiple sets of nodes 407A, 407B, 407C. Each set of nodes of the input layer 406 is configured to receive a numerical vector associated with one of the multi-character sequences 404. In FIG. 4, a set of nodes 407A of the input layer 406 receives the numerical vector for the multi-character sequence "Aaaa bb," a set of nodes 407B of the input layer 406 receives the numerical vector for the multi-character sequence "Jjjj kk," and so on.

A first hidden layer 408 transforms the numerical vectors received at the input layer 406 into hidden-layer representations. The hidden-layer representations are intended to reflect generalizations implicit in the numerical vectors themselves. To perform this transformation, the first hidden layer 408 includes multiple sets of nodes 409A, 409B, and 409C. Each set of nodes of the first hidden layer 408 is directly connected to a set of nodes of the input layer 406. These connections are weighted and enable the numerical vectors received at the input layer 406 to be passed to the first hidden layer 408. Thus, as illustrated in FIG. 4, the set of nodes 409A of the first hidden layer 408 is directly connected to the set of nodes 407A of the input layer 406, enabling the set of nodes 409A to receive the numerical vector received at the set of nodes 407A. Each set of nodes of the first hidden layer 408 is configured to transform the numerical vector received from a corresponding set of nodes of the input layer 406 to generate a second numerical vector. The transformation of the numerical vector may include (i) multiplying activation values of the numerical vector by appropriate weights associated with the connections between the input layer 406 and the hidden layer 408 (e.g., weights stored in a weight matrix), and (ii) transforming the resultant values by a sigmoidal function.

The hidden layer representation generated at the first hidden layer 408 may be successively transformed by higher-level filters to obtain a final embedding for each of the multi-character sequences 404 of the constructed response. In FIG. 4, a second hidden layer 410 transforms the second numerical vectors generated at the first hidden layer 408. To perform this transformation, the second hidden layer 410 includes multiple sets of nodes 411A, 411B, and 411C. Each set of nodes of the second hidden layer 410 is directly connected to a set of nodes of the first hidden layer 408. These connections are weighted and enable the second numerical vectors generated at the first hidden layer 408 to be passed to the second hidden layer 410. Thus, as illustrated in FIG. 4, the set of nodes 411A of the second hidden layer 410 is directly connected to the set of nodes 409A of the first hidden layer 408, enabling the set of nodes 411A to receive the second numerical vector generated by the set of nodes 409A. Each set of nodes of the second hidden layer 410 is configured to transform the second numerical vector received from a corresponding set of nodes of the first hidden layer 408 to generate a third numerical vector. The transformation of the second numerical vector may include (i) multiplying activation values of the second numerical vector by appropriate weights associated with the connections between the first hidden layer 408 and the second hidden layer 410, and (ii) transforming the resultant values by a sigmoidal function.

In the example of FIG. 4, the sets of nodes 411A, 411B, 411C of the second hidden layer 408 generate the final embedding for each of the multi-character sequences 404 of the constructed response. In other examples, additional hidden layers are used prior to generating the final embedding for each of the multi-character sequences 404 of the constructed response. In other examples, only a single hidden layer is used in generating the final embedding for each of the multi-character sequences 404 of the constructed response.

The convolutional neural network 400 further includes a convolution layer 412 configured to store a fourth numerical vector. The fourth numerical vector is based on a convolution of the third numerical vectors generated by the second hidden layer 410. Thus, in the example of FIG. 4, a convolution is applied to aggregate the final embeddings for each of the multi-character sequences 404 into a single vector representation for the constructed response as a whole. In an example, the convolution process includes the application of an element-wise maximum function to the third numerical vectors generated by the sets of nodes 411A, 411B, 411C of the second hidden layer 410. In this example, the fourth numerical vector stored at the convolution layer 412 is of the same length as each of the third numerical vectors, with the fourth numerical vector having a value for a given component that is equal to the maximum value of the corresponding components in the third numerical vectors.

The remainder of the network 400 is constructed as a standard multi-layer perceptron. As illustrated in FIG. 4, the multi-layer perceptron includes a third hidden layer 414, which may have a non-linear activation function. The third hidden layer 414 of the network 400 transforms the fourth numerical vector stored at the convolution layer 412. To perform this transformation, the third hidden layer 414 includes multiple nodes configured to receive inputs from the convolution layer 412 via a plurality of weighted connections. The inputs received at the third hidden layer 414 comprise portions of the fourth numerical vector stored at the convolution layer 412. The nodes of the third hidden layer 414 are configured to transform the fourth numerical vector. The transformation of the fourth numerical vector may include (i) multiplying activation values of the fourth numerical vector by appropriate weights associated with the connections between the convolution layer 412 and the third hidden layer 414, and (ii) transforming the resultant values by a sigmoidal function.

The transformed fourth numerical vector is provided as an input to the output layer 416, where the output layer 416 may have a non-linear activation function. The output layer 416 transforms the numerical vector received from the third hidden layer 414. To perform this transformation, the output layer 416 includes one or more nodes configured to receive inputs from the third hidden layer 414 via a plurality of weighted connections. The inputs received at the output layer 416 comprise portions of the transformed fourth numerical vector stored at the third hidden layer 414. The one or more nodes of the output layer 416 are configured to transform the received numerical vector. The transformation of this numerical vector may include (i) multiplying activation values of the numerical vector by appropriate weights associated with the connections between the third hidden layer 414 and the output layer 416, and (ii) transforming the resultant values by a sigmoidal function.

The output of the network 400 at the output layer 416 is a representation of the network's score prediction for the constructed response. The output layer 416 may be represented as a single node with a real-valued output (e.g., in instances where the task is represented as a regression) or as multiple nodes, each of which represents the probability associated with a response being assigned a given score on a scale. This latter case utilizing the probabilities frames automated response scoring as a classification task.

As explained above, the connections between the various layers of the network 400 are associated with weights. The weights are primarily determined by training the network 400 based on a plurality of human-scored constructed responses. In an example, prior to training the network 400 using the plurality of human-scored constructed responses, an unsupervised pre-training step is performed to estimate one or more of the weights. In the unsupervised pre-training step, values for weights are estimated not based on an error function associated with the ultimate discriminative criterion (e.g., scoring accuracy) but rather based on the values' ability to represent or reproduce characteristics of the input space. The use of the unsupervised pre-training step prior to the supervised training of the network 400 using the human-scored responses may allow for more efficient convergence of the convolutional neural network model. Specifically, in an example, prior to training the network 400 using scored reference responses, an un-scored response (i.e., a response that has not been given a reference score) is received. The un-scored response is processed to generate a plurality of numerical vectors that is representative of the un-scored response and that can be received at the input layer 406 of the network 400.

The plurality of numerical vectors for the un-scored response are used to train a denoising auto-encoder or restricted Boltzmann machine (RBM) in order to estimate values of the weights for the connections between the input layer 406 and the first hidden layer 408. Such weights should be suitable for encoding the regularities in the co-occurrence of directly-observable elements in the un-scored response. The weights between the input layer 406 and the first hidden layer 408 are shared across all sets of nodes (i.e., weights between the sets of nodes 407A and 409A of the input and first hidden layers 406, 408, respectively, are set to be the same as the weights between the sets of nodes 407B and 409B, and so on). Multiple un-scored responses can be used in estimating the values of the weights between the input layer 406 and the first hidden layer 408.

Because the responses used to perform the pre-training step described above are not scored, such training is unsupervised. Unsupervised pre-training can also be applied to successively-higher layers of the network 400. Thus, after performing the pre-training to estimate the weights for the connections between the input layer 406 and the first hidden layer 408, embedded representations for the un-scored response are determined at the first hidden layer 408. Given these embedded representations, the same process of unsupervised pre-training can be applied to estimate values of the weights for the connections between the first hidden layer 408 and the second hidden layer 410. The embedded representations for the un-scored response determined at the first hidden layer 408 are used as input to a denoising auto-encoder or RBM. The weights between the first hidden layer 408 and the second hidden layer 410 are shared across all sets of nodes (i.e., weights between the sets of nodes 409A and 411A of the first and second hidden layers 408, 410, respectively, are set to be the same as the weights between the sets of nodes 409B and 411B, and so on). In examples where the network 400 utilizes additional hidden layers prior to generating the final embedding for each of the multi-character sequences 404, additional unsupervised pre-training steps may be applied. It should be appreciated that the unsupervised pre-training may be performed on a per-layer basis. In other words, rather than performing the pre-training on the network 400 as a whole, pre-training may instead be performed for one layer at a time. Performing the pre-training on the single layer may be used to estimate weights for connections between two layers of the network 400.

Although the unsupervised pre-training described above may be beneficial in helping the network 400 to converge to a good solution, it is not a necessary step and may be omitted in some examples. Following the optional unsupervised pre-training, the full convolutional neural network 400 is trained using a standard optimization procedure for neural networks, such as stochastic gradient descent. The training is a supervised training that uses human-scored reference responses.

In the training, values for the various weights of the network 400 are iteratively modified in order to reduce a loss function associated with scoring accuracy, such as the root-mean-squared error. This supervised training may include an initial phase in which weights associated with (i) connections between the input layer 406 and the first hidden layer 408, and (ii) connections between the first hidden layer 408 and the second hidden layer 410 are held constant. While holding these weights constant during the initial phase, only weights associated with connections between the convolution layer 412 and the third hidden layer 414 and connections between the third hidden layer 414 and the output layer 416 are trained.

After the determining of the weights for the network 400, constructed responses may be scored by applying the network 400 to numerical vectors that are representative of the constructed responses. It should be appreciated that the scoring of constructed responses using the network 400 applies a "deep learning" approach, which reduces or eliminates the need for manual engineering of scoring features by humans. Specifically, applying the network 400 to predict a score for a constructed response does not involve the extraction of human-engineered features from the constructed response. Instead, during the supervised training step, the convolutional neural network 400 itself identifies important characteristics of human-scored reference responses that are related to the classifications or scores assigned to the reference responses by human graders. Representations of these characteristics are combined to produce an "embedding" or representation of the response in a latent space, and aggregate information from the embedded representations (e.g., as represented by the fourth numerical vector stored by the convolution layer 412) is used to predict the score that the constructed response should receive.

It should be appreciated that aspects of the convolutional neural network 400 may be modified in other examples. As described above, hidden units within the network 400 may be stacked into multiple layers that successively transform the representations of previous layers. Stacked hidden layers may be used at the filter level applied to particular multi-character sequences 404 of the response (i.e., as illustrated by the stacked hidden layers 408, 410 of FIG. 4). Additionally, multiple stacked hidden layers may feed into the output layer 416. Thus, although the example of FIG. 4 depicts the multi-layer perceptron including the single hidden layer 414 feeding into the output layer 416, in other examples, multiple stacked hidden layers may feed into the output layer 416.

Figure 5:
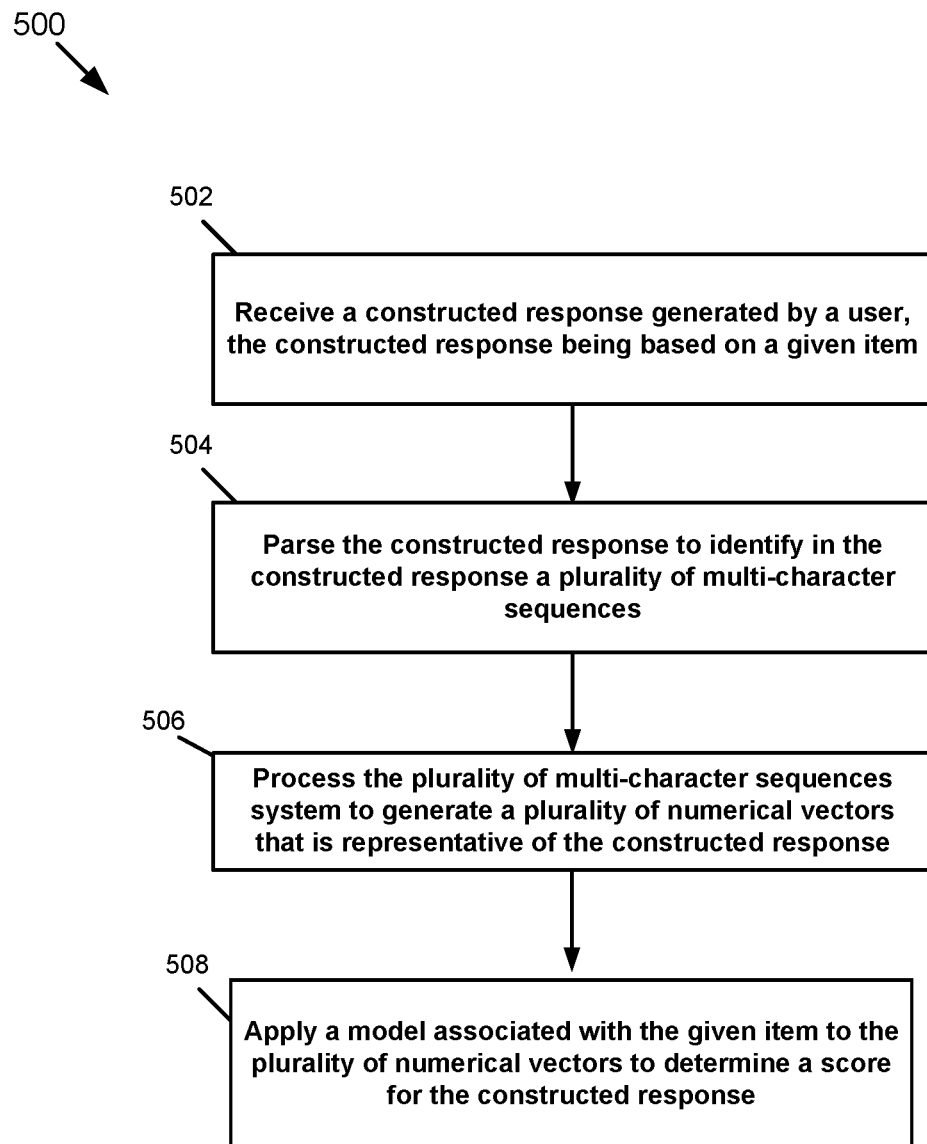
FIG. 5 is a flowchart depicting operations of an example computer-implemented method of automatically scoring a constructed response generated by a user.

FIG. 5 is a flowchart 500 depicting operations of an example computer-implemented method of automatically scoring a constructed response generated by a user. At 502, a constructed response generated by a user is received, the constructed response being based on a given item. At 504, the constructed response is parsed with a processing system to identify in the constructed response a plurality of multi-character sequences. At 506, the plurality of multi-character sequences are processed with the processing system to generate a plurality of numerical vectors that is representative of the constructed response. To illustrate steps 504 and 506 of FIG. 5, FIG. 6 illustrates aspects of processing a constructed response 626 to generate a plurality of numerical vectors 619, 648, 649 that is representative of the constructed response 626. In an example, in both training and scoring phases, a convolutional neural network may require that a constructed response be transformed into a plurality of numerical vectors that is representative of the response (e.g., the convolutional neural network may not be able to accept raw text of the response, thus requiring the transformation of the constructed response into a plurality of numerical vectors that is representative of the response). Thus, it should be appreciated that the generation of numerical vectors described below with reference to FIG. 6 may be applied in both training and scoring phases of the convolutional neural network model.

In FIG. 6, at 620, the constructed response 626 is received. The constructed response 626 includes only the raw text "dogcatbob." At 621, the constructed response 626 is parsed to identify in the constructed response 626 a plurality of multi-character sequences 627-629. Each of the multi-character sequences may have a same number of characters. In FIG. 6, the constructed response 626 has been parsed to identify a first multi-character sequence 627 ("dog"), a second multi-character sequence 628 ("cat"), and a third multi-character sequence 629 ("bob"). Each of these multi-character sequences 627-629 has a same number of characters. In an example, the multi-character sequences identified in the step 621 are known as "fixed-length windows" or "text windows" of the constructed response 626.

At 622, each of the multi-character sequences 627-629 is parsed to identify in the multi-character sequence a plurality of single characters. In FIG. 6, the first multi-character sequence 627 has been parsed to identify single characters ("d," "o," "g") 630-632 in the first multi-character sequence 627. The second and third multi-character sequences 628, 629 are likewise parsed to identify the single characters 633-635 and 636-638, respectively.

At 623, each of the single characters 630-638 is transformed into a numerical vector using an encoding algorithm. In an example, the resulting numerical vectors comprise one-dimensional arrays that are configured to store numbers and that have a fixed length. In FIG. 6, the single character 630 (i.e., comprising the letter "d") is transformed into a numerical vector 639 of length three (i.e., a numerical vector with three elements, a first element storing a value "0," a second element storing a value "0," and a third element storing a value "1"). The other single characters 631-638 are likewise transformed into numerical vectors 640-647 having the same fixed length of three. Various encoding schemes may be used to generate the numerical vectors at step 623. Thus, the resulting numerical vectors may be sparse (e.g., one-hot) representations of the input characters in one example, and in another example, the resulting numerical vectors may be distributed representations of the input characters obtained through another process (e.g., including, but not limited to, Latent Semantic Analysis or other dimensionality-reducing techniques). Although the example numerical vectors 639-647 comprise elements storing binary values, in other examples, the numerical vectors 639-647 may include elements storing natural numbers, integers, real numbers, etc.

At 624, for each of the multi-character sequences 627-629, the numerical vectors for the associated single characters are joined end-to-end to generate the second numerical vectors 648, 649, 619. In FIG. 6, the numerical vectors 639-641 for the single characters 630-632 that are associated with the multi-character sequence 627 are joined end-to-end (e.g., concatenated) to generate the second numerical vector 648 that is representative of the multi-character sequence 627. Second numerical vectors 649, 619 that are representative of the multi-character sequences 628, 629, respectively, are generated in a similar manner. All of the second numerical vectors 648, 649, 619 have a fixed length of nine in the example of FIG. 6. Thus, in FIG. 6, vectors 648, 649, 619 of fixed-length are obtained by concatenating the numerical vectors 639-647 associated with particular multi-character sequences 627-629 of the response 626. In an example, each of the vectors 648, 649, 619 has a length of M*N, where M is the number of characters in each of the fixed-length multi-character sequences 627-629, and N is a vector length for each of the vectors 639-647 associated with the single characters 630-638.

At 625, the numerical vectors 648, 649, 619 are provided as inputs to an input layer of a convolutional neural network. In FIG. 6, the numerical vectors 648, 649, 619 are received at respective sets of nodes 616, 617, 618 of the input layer of the convolutional neural network. The sets of nodes 616, 617, 618 may be similar to the sets of nodes 407A, 407B, 407C of the input layer 406 illustrated in FIG. 4.

It should be understood that the process described above with reference to FIG. 6 may be modified in other examples. For example, in the example of FIG. 6, the windows 627-629 of the constructed response 626 comprise a fixed number of characters of the constructed response 626, and single characters 630-638 are the directly-observable elements of the response 626 used in generating the numerical vectors 639-647 that are subsequently joined end-to-end. In other examples, however, the windows may comprise a fixed number of words of the constructed response. In these examples, individual words may be used as the direct observables of the constructed response that are used in generating numerical vectors that are subsequently joined end-to-end. For example, a constructed response having nine words may be parsed to identify three windows of the response, each window including three words. Each of the windows may be further parsed to identify in the window a plurality of individual words. Each of the individual words may be transformed into a numerical vector using an encoding algorithm. Then, for each window of the response, the numerical vectors for the associated words may be joined end-to-end to generate a single numerical vector that is representative of the window. These numerical vectors may then be provided as inputs to an input layer of a convolutional neural network.

Additionally, although the approaches herein are described in terms of textual constructed responses, spoken responses may be scored in a similar manner. In an example, cepstral features associated with acoustic frames could be used as the direct observables of the response. For example, a spoken response having a duration of 9 seconds may be parsed to identify three windows of the spoken response, with each window including 3 seconds of audio. Each of the windows may be further parsed to identify in the window a plurality of cepstral features. Each of the cepstral features may be transformed into a numerical vector using an encoding algorithm. Then, for each window of the response, the numerical vectors for the associated cepstral features may be joined end-to-end to generate a single numerical vector that is representative of the window. These numerical vectors may then be provided as inputs to an input layer of a convolutional neural network. Ultimately, any open-ended response type may be modeled using the deep learning techniques described herein, so long as the response can be segmented into a sequence of directly-observable events that can be represented as numerical vectors.

Although examples described herein include transforming the constructed response into a plurality of numerical vectors that is representative of the constructed response, in other examples, this transformation is not necessary. In these other examples, inputs to the convolutional neural network could include, for example, raw character inputs or raw audio from a spoken response.

With reference again to FIG. 5, after generating the plurality of numerical vectors that is associated with the constructed response, at 508, a convolutional neural network model associated with the given item is applied to the plurality of numerical vectors to determine a score for the constructed response. The convolutional neural network model includes an input layer configured to receive the plurality of numerical vectors, the input layer being connected to a following layer of the convolutional neural network model via a first plurality of connections. Each of the connections has an associated first weight and passes a portion of the plurality of numerical vectors to the following layer. In an example, at least a subset of the connections have a same first weight. The convolutional neural network may also include a convolution layer including a plurality of nodes (e.g., convolution units). Each node of the convolution layer may receive input from an immediately-preceding layer of the convolutional neural network. In an example, the immediately-preceding layer is the input layer, such that each node of the convolution layer receive input from the plurality of numerical vectors received at the input layer.

The convolutional neural network model also includes an intermediate layer of nodes configured to receive inputs from the convolution layer of the convolutional neural network model via a second plurality of connections, each of the second plurality of connections having an associated second weight. In an example, at least a subset of the second plurality of connections have a same second weight. Each node of the intermediate layer generates an output based on a weighted summation of received inputs. The convolutional neural network model further includes an output layer connected to the intermediate layer via a third plurality of connections, each of the third plurality of connections having an associated third weight and passing one of the outputs from the intermediate layer to the output layer. The output layer is configured to generate a score for the constructed response based on the received outputs and the third weights.

Figure 7A:
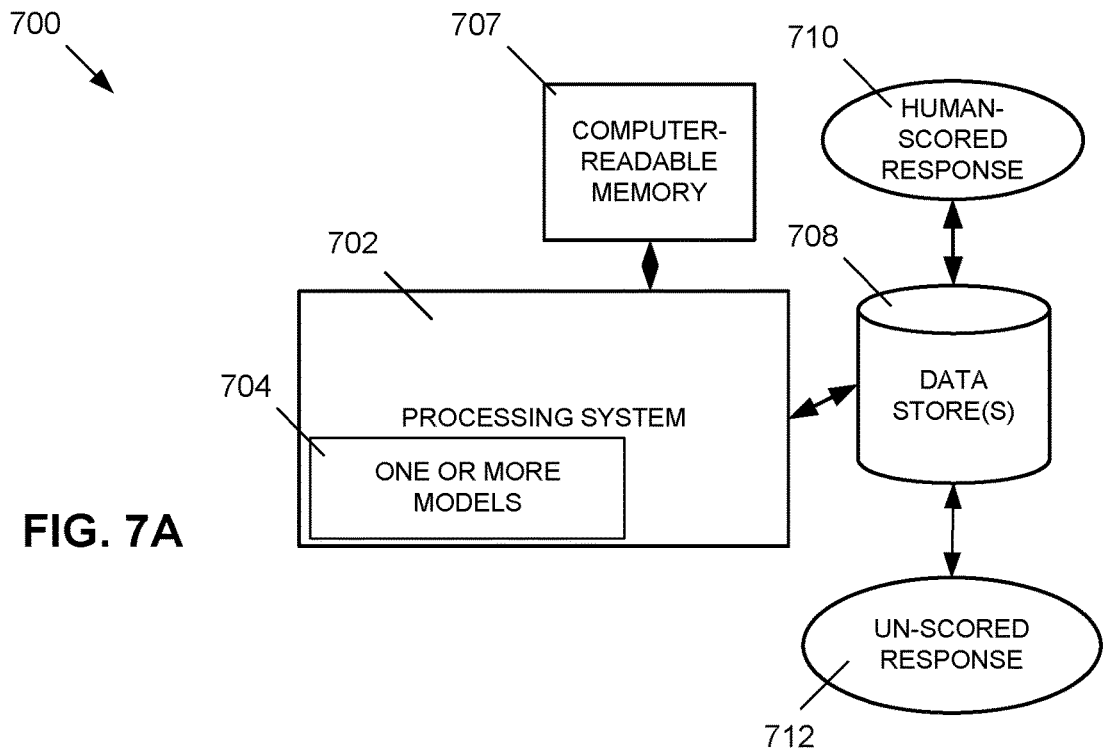
FIGS. 7A, 7B, and 7C depict example systems for automatically scoring a constructed response generated by a user.
Figure 7B:
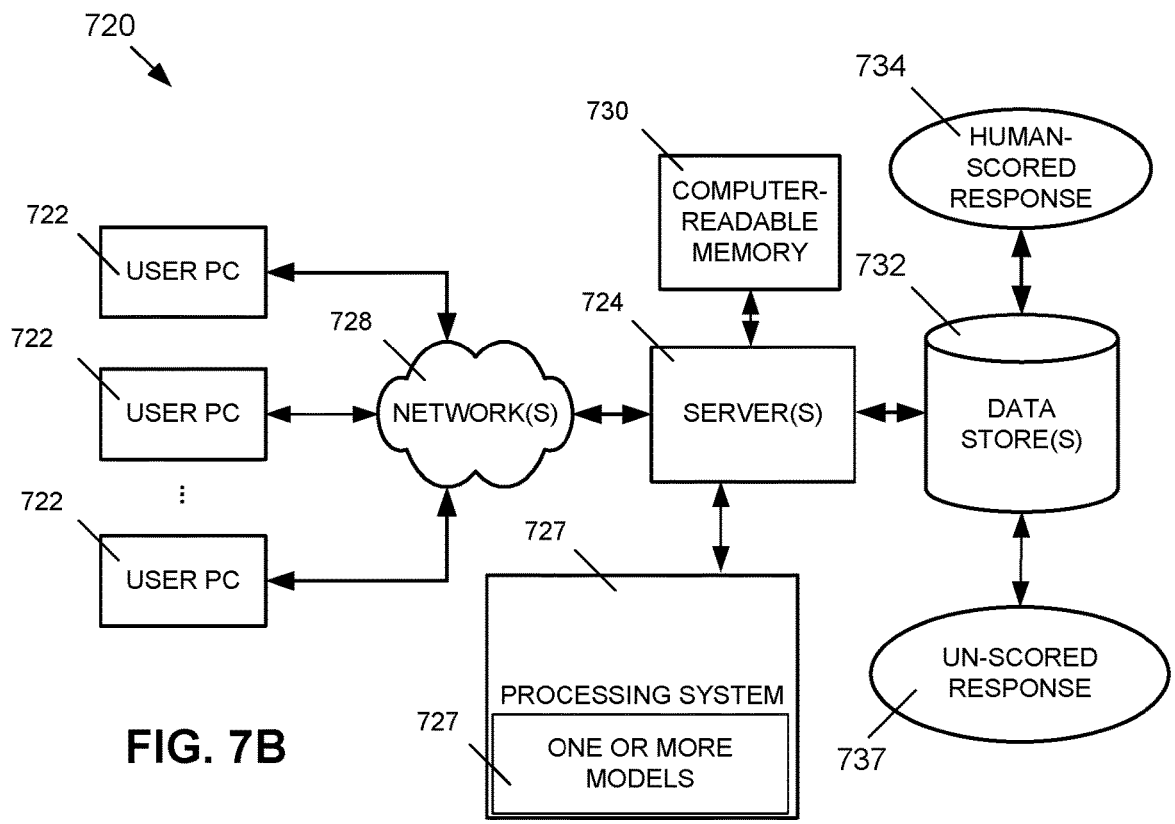
Figure 7C:
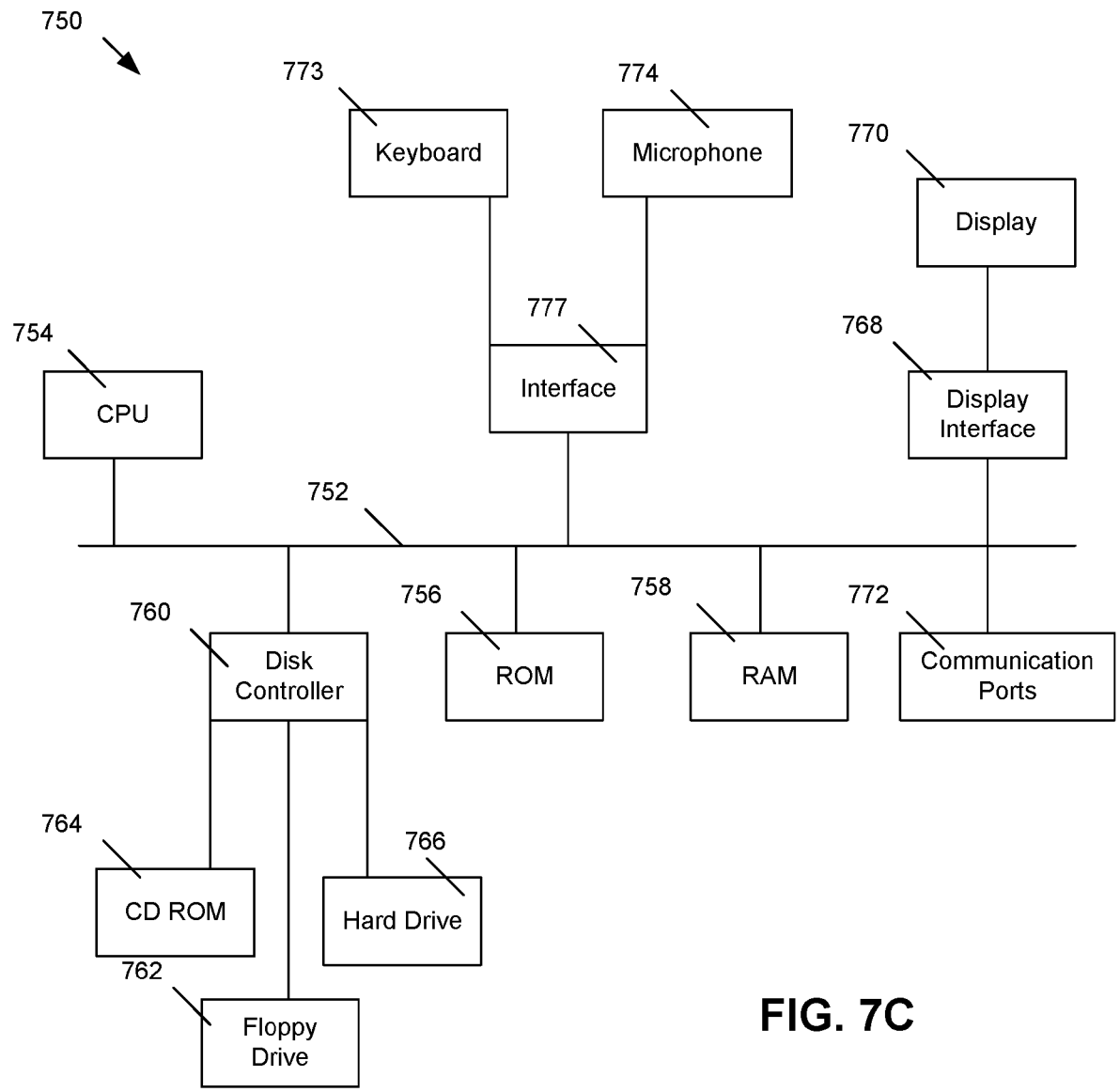

FIGS. 7A, 7B, and 7C depict example systems for automatically scoring a constructed response generated by a user. For example, FIG. 7A depicts an exemplary system 700 that includes a standalone computer architecture where a processing system 702 (e.g., one or more computer processors located in a given computer or in multiple computers that may be separate and distinct from one another) includes one or more models 704 being executed on the processing system 702. The processing system 702 has access to a computer-readable memory 707 in addition to one or more data stores 708. The one or more data stores 708 may include human-scored responses 710 as well as un-scored responses 712. The processing system 702 may be a distributed parallel computing environment, which may be used to handle very large-scale data sets.

FIG. 7B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain human-scored responses 734 as well as un-scored responses 737.

FIG. 7C shows a block diagram of exemplary hardware for a standalone computer architecture 750, such as the architecture depicted in FIG. 7A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for automatically scoring a constructed response generated by a user. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 707, 730, 756, 758 or data stores 708, 732, 762, 764, 766 may include one or more data structures for storing and associating various data used in the example systems for automatically scoring a constructed response generated by a user. For example, a data structure may be used to relate connections of a convolutional neural network with associated weights. Other aspects of the example systems for automatically scoring a constructed response generated by a user may be stored and associated in the one or more data structures (e.g., numerical measures, scores for human-scored reference responses, etc.).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of automatically scoring a constructed response using a convolutional neural network, the method comprising:
    processing a constructed response with a processing system to generate a plurality of first vectors representative of the constructed response;
    applying, using the processing system, a convolution layer of a convolutional neural network to the plurality of first vectors;
    applying, using the processing system, a hidden layer of the convolutional neural network to an output of the convolution layer; and
    applying, using the processing system, an output layer of the convolutional neural network to an output of the hidden layer in order to generate a score for the constructed response, the output layer generating the score based on one or more features selected by the processing system, said one or more features not identified by a human for use in generating the score;
    wherein the convolutional neural network is trained with a processing system using vectors representative of reference responses to determine weights of the convolutional neural network and the features not identified by a human.

2. The computer-implemented method of claim 1, wherein the features are identified by the convolutional neural network.

3. The computer-implemented method of claim 1, wherein the processing of the constructed response includes:
    parsing the constructed response with the processing system to identify in the constructed response a plurality of words; and
    transforming, using an encoding algorithm, each of the words into a vector containing numeric values.

4. The computer-implemented method of claim 1, wherein the constructed response is a spoken response, the processing of the constructed response including:
    parsing the constructed response with the processing system to identify in the constructed response a plurality of acoustic frames; and
    transforming, using a signal processing algorithm, each of the acoustic frames into a vector containing numeric values.

5. The computer-implemented method of claim 1, wherein the plurality of second vectors are representative of one or more patterns included in the constructed response.

6. The computer-implemented method of claim 1, further comprising:
    applying, using the processing system, a second convolution layer of the convolutional neural network to the plurality of second vectors, the second convolution layer including a third plurality of nodes that each receive input from the plurality of second vectors.

7. The computer-implemented method of claim 1, wherein each node of the convolution layer applies a set of kernels that operate on the input received from the plurality of first vectors.

8. The computer-implemented method of claim 1, wherein at least a subset of the nodes of the convolution layer share weights for computing activations based on the input received from the plurality of first vectors.

9. A system for automatically scoring a constructed response using a convolutional neural network, the system comprising:
    a processing system; and
    computer-readable memory in communication with the processing system encoded with instructions for commanding the processing system to execute steps comprising:
        processing a constructed response with a processing system to generate a plurality of first vectors representative of the constructed response;
        applying a convolution layer of a convolutional neural network to the plurality of first vectors;
        applying a hidden layer of the convolutional neural network to an output of the convolution layer; and
        applying an output layer of the convolutional neural network to an output of the hidden layer in order to generate a score for the constructed response, the output layer generating the score based on one or more features selected by the processing system, said one or more features not identified by a human for use in generating the score;
        wherein the convolutional neural network is trained with a processing system using vectors representative of reference responses to determine weights of the convolutional neural network and the features not identified by a human.

10. The system of claim 9, wherein the features are identified by the convolutional neural network.

11. The system of claim 9, wherein the processing system is configured to execute the steps including:
parsing the constructed response to identify in the constructed response a plurality of words; and
transforming, using an encoding algorithm, each of the words into a vector containing numeric values.

12. The system of claim 9, wherein the constructed response is a spoken response, the processing system being configured to execute the steps including:
parsing the constructed response to identify in the constructed response a plurality of acoustic frames; and
transforming, using a signal processing algorithm, each of the acoustic frames into a vector containing numeric values.

13. The system of claim 9, wherein the plurality of second vectors are representative of one or more patterns included in the constructed response.

14. The system of claim 9, wherein the processing system is configured to execute the steps including:
applying a second convolution layer of the convolutional neural network to the plurality of second vectors, the second convolution layer including a third plurality of nodes that each receive input from the plurality of second vectors.

15. The system of claim 9, wherein each node of the convolution layer applies a set of kernels that operate on the input received from the plurality of first vectors.

16. The system of claim 9, wherein at least a subset of the nodes of the convolution layer share weights for computing activations based on the input received from the plurality of first vectors.

17. A non-transitory computer-readable storage medium for automatically scoring a constructed response using a convolutional neural network, the computer-readable storage medium comprising computer executable instructions which, when executed, cause a processing system to execute steps including:

processing a constructed response with a processing system to generate a plurality of first vectors representative of the constructed response;

applying a convolution layer of a convolutional neural network to the plurality of first vectors;

applying a hidden layer of the convolutional neural network to an output of the convolution layer; and applying an output layer of the convolutional neural network to an output of the hidden layer in order to generate a score for the constructed response, the output layer generating the score based on one or more features selected by the processing system, said one or more features not identified by a human for use in generating the score;

wherein the convolutional neural network is trained with a processing system using vectors representative of reference responses to determine weights of the convolutional neural network and the features not identified by a human.

18. The non-transitory computer-readable storage medium of claim 17, wherein the features are identified by the convolutional network.

19. The non-transitory computer-readable storage medium of claim 17, wherein the processing system is configured to execute the steps including:
parsing the constructed response to identify in the constructed response a plurality of words; and
transforming, using an encoding algorithm, each of the words into a vector containing numeric values.

20. The non-transitory computer-readable storage medium of claim 17, wherein the constructed response is a spoken response, the processing system being configured to execute the steps including:
parsing the constructed response to identify in the constructed response a plurality of acoustic frames; and
transforming, using a signal processing algorithm, each of the acoustic frames into a vector containing numeric values.

* * * * *